(12) United States Patent
Sehgal (10) Patent No.: US 8,470,521 B2
(45) Date of Patent: *Jun. 25, 2013

(54) METHOD FOR REMOVING ANTIPLATELET AGENT AND ANTICOAGULANT FROM A PLATELET COMPOSITION BY DIAFILTRATION

(75) Inventor: Lakshman R. Sehgal, Dana Point, CA (US)

(73) Assignee: Biovec Transfusion, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,360

(22) Filed: Jul. 31, 2012

(65) Prior Publication Data
US 2012/0315619 A1 Dec. 13, 2012

Related U.S. Application Data

(63) Continuation of application No. 12/792,259, filed on Jun. 2, 2010.

(60) Provisional application No. 61/187,052, filed on Jun. 15, 2009, provisional application No. 61/282,306, filed on Jan. 19, 2010.

(51) Int. Cl.
*A01N 1/02* (2006.01)

(52) U.S. Cl.
USPC .......................................................... 435/2

(58) Field of Classification Search
None
See application file for complete search history.

(56) References Cited

U.S. PATENT DOCUMENTS

| 4,800,016 A | 1/1989 | Yang |
| 5,801,063 A | 9/1998 | Grandics et al. |
| 5,858,238 A | 1/1999 | McRea et al. |
| 6,733,471 B1 | 5/2004 | Ericson et al. |
| 2008/0044852 A1* | 2/2008 | Kanayinkal et al. ......... 435/68.1 |

OTHER PUBLICATIONS

Arnaud et al., "Use of hollow fiber membrane filtration for the removal of DMSO from platelet concentrates", Platelets 14 : 131-137 (2003).*
Hudson et al., "Predicting Drug Removal by Dialysis using an In Vitro System", http://www.kidney.org/news/meetings/clinical/pdf/Abstracts2008/Hemodialysis-Other/Hudson_Predicting882.pdf (2008).*
SpectrumLabs.Com pp. 0-13, http://www.spectrumlabs.com/lit/420x10655x000.pdf accessed Dec. 20, 2012.*
International Search Report of International Application No. PCT/US2010/037203, mailed Feb. 24, 2011.
Written Opinion of the International Search Authority on International Application No. PCT/US2010/037203, mailed Feb. 24, 2011.

* cited by examiner

*Primary Examiner* — Sandra Saucier
(74) *Attorney, Agent, or Firm* — Ping Wang; Andrews Kurth, LLP (57) ABSTRACT

The present invention relates to methods for removing antiplatelet agents and anticoagulants from a platelet preparation. In one embodiment, the method includes the step of flowing the platelet preparation through a filtering tube comprising a filtering membrane and separating the antiplatelet agents and anticoagulants from the platelet preparation by tangential flow filtration. In another embodiment, the method includes the step of passing the platelet preparation through porous material that specifically binds to the antiplatelet agents and anticoagulants.

7 Claims, 7 Drawing Sheets
(6 of 7 Drawing Sheet(s) Filed in Color)

METHOD FOR REMOVING ANTIPLATELET AGENT AND ANTICOAGULANT FROM A PLATELET COMPOSITION BY DIAFILTRATION

This application is a continuation application of U.S. application Ser. No. 12/792,259 filed on Jun. 2, 2010, which claims priority from U.S. Provisional Application Ser. No. 61/187,052, filed Jun. 15, 2009, and from U.S. Provisional Application Ser. No. 61/282,306, filed Jan. 19, 2010. The entirety of all of the aforementioned applications is incorporated herein by reference.

FIELD

The present invention relates generally to preservation of platelets and, in particular, to methods and devices for removing antiplatelet and/or anticoagulation agents from stored platelets.

BACKGROUND

When blood vessels are damaged, cell fragments released from the bone marrow, called platelets, adhere to the walls of blood vessels and form clots to prevent blood loss. It is important to have adequate numbers of normally functioning platelets to maintain effective clotting, or coagulation, of the blood. Occasionally, when the body undergoes trauma, or when the platelets are unable to function properly, it is necessary to replace or transfer platelet components of blood into a patient. Most commonly, platelets are obtained from volunteer donors either as a component of a whole blood unit, or via plateletpheresis (withdrawing only platelets from a donor and re-infusing the remaining of the blood back into the donor). The platelets then are transferred to a patient as needed, a process referred to as "platelet transfusion".

Platelet transfusion is indicated under several different scenarios. For example, an acute blood loss, either during an operation or as a result of trauma, can cause the loss of a large amount of platelets in a short period of time. Platelet transfusion is necessary to restore a normal ability to control blood flow, or haemostasis. In a medical setting, an individual can develop a condition of decreased number of platelets, a condition known as thrombocytopenia. The condition can occur as a result of chemotherapy, and requires platelet transfusion to restore normal blood clotting.

Unlike red blood cells, which can be stored for forty-five (45) days, platelets can be stored for only five to seven days. The short storage term, or shelf-life, of the platelets severely limits the useful span for a platelet supply. A consequence of this short shelf-life is that platelets must be collected close to their time of use, which makes it extremely difficult to coordinate platelet collection and platelet supply.

One reason that platelets have such a short shelf-life is because they become activated during the process of collection. The activation process leads to externalization of platelet canalicular surfaces exposing receptor sites, such as GPIIb/IIIa. Phosphatidylserine residues on activated platelets tend to cause platelet aggregation, which results in cell death (i.e., apoptosis) upon re-infusion into patients. Thus, a platelet functional half-life is significantly reduced.

Another reason that platelets have a short shelf-life is because an inadequate oxygen supply alters the metabolic activity of the platelets. In an environment lacking a sufficient oxygen supply, the platelets undergo an anaerobic mechanism leading to accumulation of lactic acid. The increased concentration of lactic acid causes a drop in pH, and results in cell death. Although platelets can be stored in gas permeable bags using a shaker bath under a stream of air to help overcome this problem, such storage methods are costly and extremely inefficient and inadequate in meeting the oxygen requirements of the stored platelets.

Platelet sterility is difficult to maintain because platelets cannot be stored at low temperatures, for example −80° C. to 40° C. As previously mentioned, a low storage temperature for the platelets initiates an activation process within the platelets that leads to aggregation and cell death. Nonetheless, bacterial growth in the platelet medium at suitable storage temperatures, e.g., room temperature, can lead to an unacceptable occurrence of bacterial contamination in platelets used for transfusion. As a result, the Food and Drug Administration (FDA) limits the storage time of platelets to five days, thereby safeguarding the transfusion supply from bacterial contamination.

Antiplatelet agents and/or anticoagulants have been utilized for the preservation of platelets. These preservative agents, when added to freshly collected platelets, either by the buffy coat method or by aphaeresis, permit extended storage of platelets in a temperature range of −80° C. to 40° C., while maintaining the stability of platelets as well as their functionality when transfused.

The antiplatelet agents and anticoagulants, however, need to be removed from the platelets storage bags prior to transfusion into the patient, thereby eliminating any concerns of adverse effects of the preservative agents.

SUMMARY

One aspect of the present invention relates to a method for removing antiplatelet agents and anticoagulants from a platelet preparation. The method includes flowing the platelet preparation through a filtering tube comprising a filtering membrane and separating the antiplatelet agents and anticoagulants from the platelet preparation by tangential flow filtration.

In an embodiment, the filter membrane comprises a material selected from the group consisting of regenerated cellulose, cellulose acetate, polyamide, polysulfone, polyethylsulfone and combinations thereof.

In a related embodiment, the filter membrane comprises polysulfone or polyethylsulfone.

In another embodiment, the filter membrane has a pore size ranging from molecular cut off of 3000 daltons to 0.5 micron.

In another embodiment, the filtering tube has an inner diameter of at least 0.5 mm.

Also disclosed is a method for removing antiplatelet agents and anticoagulants from a platelet preparation. The method includes passing the platelet preparation through porous material that specifically binds to the antiplatelet agents and anticoagulants.

In one embodiment, the porous material comprises a nanofiber.

In a related embodiment, the nanofiber is a cellulose nanofiber.

In another related embodiment, the cellulose nanofiber has a diameter between 5-60 nm.

In another related embodiment, the cellulose nanofiber is modified to provide specific binding sites for a given antiplatelet agent or an anticoagulant.

In another embodiment, the porous material comprises a reinforced composite film comprising 90% polyvinyl alcohol and 10% nanofiber.

In another embodiment, the nanofiber is a biodegradable nanofiber.

In a related embodiment, the biodegradable nanofiber comprises poly(glycolic acid) (PGA), poly(L-lactic acid) (PLLA), poly(lactic-co-glycolic acid) (PLGA), or combinations thereof.

In another related embodiment, the surface of the biodegradable nanofiber is chemically modified by oxygen plasma treatment and in situ grafting of hydrophilic acrylic acid (AA).

In another related embodiment, the biodegradable nanofiber forms a porous filter with a thickness of 200-800 nm, a pore size of 2-30 micron, and a porosity of 94-96%.

In another embodiment, the nanofiber is a carbon nanofiber.

In a related embodiment, the carbon nanofiber is a chemically modified carbon nanofiber.

Also disclosed is a method for antiplatelet agents and anticoagulants from a platelet preparation using diafiltration. The method includes circulating the platelet preparation through a hollow fiber membrane capable of separating the antiplatelet agents and anticoagulants from the platelet preparation, wherein a diafiltration buffer is added to the platelet preparation during circulation to maintain a constant volume of the platelet preparation.

In one embodiment, the hollow fiber membrane comprises a material selected from the group consisting of regenerated cellulose, cellulose acetate, polyamide, polyurethane, polypropylene, polysulfone, polyethersulfone, polycarbonate, nylon, polyimide and combinations thereof.

In another embodiment, the hollow fiber membrane comprises polysulfone or polyethylsulfone.

In another embodiment, the hollow fiber membrane has an inner diameter of at least 0.5 mm and a pore size ranging from molecular cut off of 3000 daltons to 0.5 micron.

Also disclosed is a method for removing antiplatelet agents and anticoagulants from a platelet preparation. The method includes flowing the platelet preparation through the surface of a filtering membrane and separating the antiplatelet agents and anticoagulants from the platelet preparation by tangential flow filtration.

In one embodiment, the filtering membrane has a pore size ranging from molecular cut off of 3000 daltons to 0.5 micron.

Also disclosed is a filter for removing antiplatelet agents and anticoagulants from a platelet preparation. The filter comprises a nanofiber modified to bind specifically to an antiplatelet agent or an anticoagulant.

In one embodiment, the nanofiber is selected from the group consisting of cellulose nanofibers, biodegradable nanofibers and carbon nanofibers.

BRIEF DESCRIPTION OF FIGURES

The file of this patent contains at least one drawing executed in color. Copies of this patent with color drawings will be provided by the Patent and Trademark Office upon request and payment of the necessary fee.

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

One aspect of the present invention relates to a method for removing antiplatelet agents and anticoagulants from a platelet preparation. The method includes the step of flowing the platelet preparation through a filtering tube comprising a filtering membrane and separating the antiplatelet agents and anticoagulants from the platelet preparation by tangential flow filtration.

Filtration is a pressure driven separation process that uses separation process that uses membranes to separate components in a liquid solution or suspension based on their size and charge differences Filtration can be broken down into two different operational modes—normal flow filtration (NFF) and tangential flow filtration (TFF). In NFF, fluid is convected directly toward the membrane under an applied pressure. Particulates that are too large to pass through the pores of the membrane accumulate at the membrane surface or in the depth of the filtration media, while smaller molecules pass through to the downstream side. This type of process is also called dead-end filtration.

In TFF, the fluid is pumped tangentially along the surface of the membrane. An applied pressure serves to force a portion of the fluid through the membrane to the filtrate side. As in NFF, particulates and macromolecules that are too large to pass through the membrane pores are retained on the upstream side. However, in this case the retained components do not build up at the surface of the membrane. Instead, they are swept along by the tangential flow. This feature of TFF makes it an ideal process for finer sized-based separations. TFF is also commonly called cross-flow filtration. However, the term "tangential" is descriptive of the direction of fluid flow relative to the membrane.

In one embodiment, the antiplatelet agents and anticoagulants are separated from the platelet preparation by diafiltration, wherein a diafiltration buffer is added to the platelet preparation during circulation to maintain a constant volume of the platelet preparation.

Diafiltration is a TFF method of "washing" or removing permeable molecules (impurities, salts, solvents, small proteins, etc) from a solution. Because it is a significantly faster and scalable method, diafiltration frequently replaces membrane tube dialysis. The success of diafiltration is largely determined by the selection of an appropriate membrane. The membrane pores must be large enough to allow the permeable species to pass through and small enough to retain the larger species. A rule of thumb in selecting your first membrane is to choose a membrane whose pore size is rated 2-5× smaller than anything you are trying to retain and 2-5× larger than anything you are trying to pass through the membrane. A large variety of pore sizes are available in the ultrafiltration and microfiltration range for this purpose.

The filtering membranes used in TFF are typically made of regenerated cellulose, cellulose acetate or polyamide (as the filter composite on polysulfone support), polysulfone or polyethylsulfone. These membranes come with a wide range of pore sizes. The effective pore size defines the process and the particular application. Microfiltration refers to membranes with nominal pore size from 0.05 micron to 1.0 micron. Microfiltration membranes retain intact cells and cell debris and pass colloidal materials, viruses, proteins and salts. Ultrafiltration membranes have a nominal molecular weight limit (NMWL) between 1 and 1000 kD. They typically retain proteins and pass peptides and salts. Nanofiltration and reverse osmosis membranes have a NMWL of less than 1 kD. They will retain antibiotics and most salts and pass water and some salts.

These membranes can be chemically modified to provide a greater positive or negative charge depending on the specific application thereby selectively binding a solute of interest. Alternatively, the surface chemistry of these membranes can be modified to specifically bind solutes of interest such as the antiplatelet agents or direct thrombin inhibitors.

In certain embodiments, the membranes are hollow fiber membranes. TFF using a hollow fiber membrane is accomplished by pumping the process solution from a process reservoir into the inner diameter of a tubular fiber. The pores in the walls of the fiber allow the permeable species to pass through, while the larger species is retained in the bulk flow. The bulk flow then continues through to the 'retentate' end of the fiber and returns to the process reservoir that it was pumped out of Diafiltration occurs by adding the replacement buffer or washing solution to the process reservoir either at a rate equal to the permeate flow (continuous diafiltration) or by re-dilution after a certain level of concentration (discontinuous diafiltration). Both methods result in a decrease in concentration of the permeable species while the retained species remains in the solution that is gently circulating through the tangential flow system.

Figure 1:
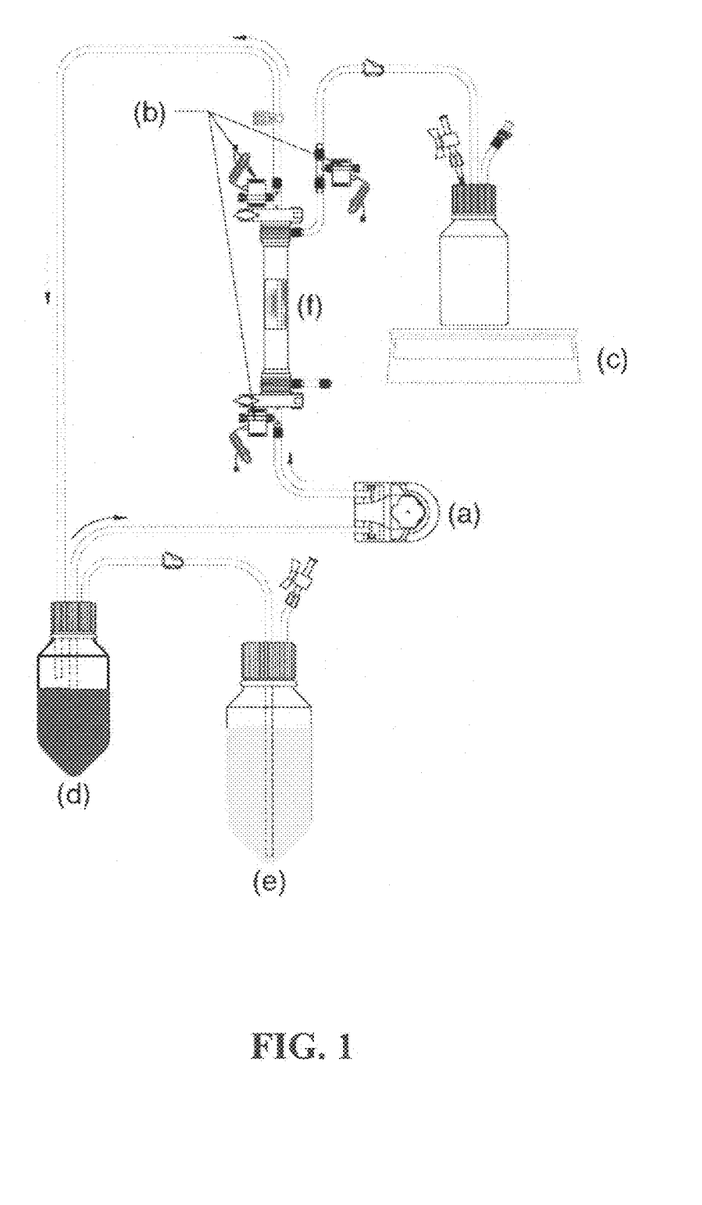
FIG. 1 is a diagram showing a typical continuous diafiltration system.

FIG. 1 shows a typical continuous diafiltration system in which the buffer is automatically added to the process reservoir by vacuum suction. It includes a pump (a), pressure measurement device (b), flow measurement device (c), process reservoir (d), buffer reservoir (e) and hollow fiber filter module (f). The pump circulates the process solution from the process reservoir, through the filter and back to the process vessel at a controlled flow and shear rate. Pressure measurements are acquired in this re-circulation loop to control and record the driving force through the membrane. Careful measurement of the permeate flow rate enables accurate process scale up and process optimization. Diafiltration occurs simply by adding the diafiltration buffer to this circulation loop. Working with a hollow fiber module, tubing and an air-tight sealable bottle is a simple means of performing a continuous diafiltration.

To begin the diafiltration in an airtight system, a vacuum needs to be created in the process vessel. This can be accomplished by submerging the buffer addition tube into a bottle of diafiltration buffer as shown in FIG. 1. As permeate flows out of the system, the vacuum in the sealed process reservoir pulls buffer into it at a flow rate equal to the process flux. When the target volume of diafiltration buffer has been collected in the permeate vessel, the process is stopped simply by stopping the permeate flow and breaking the vacuum seal on the feed reservoir.

When airtight systems are not possible, particularly for pilot and manufacturing scale processes, buffer addition can be controlled to match the permeate flow rate through the use of a single- or double-headed secondary pump adding buffer into the feed or process reservoir. Sometimes, it is advantageous to reduce the process volume by concentration before diafiltration. There is a relationship between the volume of buffer required to remove a permeable species and the product solution volume in the process reservoir. By understanding this relationship, the cost associated with the process time and the volume of buffer can be minimized.

Antiplatelet agents, as used hereinafter, refer to any agent that reversibly impedes platelet activation and/or aggregation. Agents that can impede platelet activation and/or aggregation include, but are not limited to, heparin, heparin substitutes, prothrombopenic anticoagulants, platelet phosphodiesterase inhibitors, dextrans, and the like, or mixtures thereof. Examples of heparin and heparin substitutes include, but are not limited to, heparin calcium, such as calciparin; heparin low-molecular weight, such as enoxaparin and lovenox; heparin sodium, such as heparin, lipo-hepin, liquaemin sodium, and panheprin; and heparin sodium dihydroergotamine mesylate. Suitable prothrombopenic anticoagulants are, for example, anisindione, dicumarol, warfarin sodium, and the like. More specific examples of phosphodiesterase inhibitors suitable for use in the invention include, but are not limited to, anagrelide, dipyridamole, pentoxifyllin, and theophylline. Examples of dextrans are, for example, dextran 70, such as HYSKON® (CooperSurgical, Inc., Shelton, Conn., U.S.A.) and MACRODEX® (Pharmalink, Inc., Upplands Väsby, Sweden), and dextran 75, such as GENTRAN® 75 (Baxter Healthcare Corporation, Deerfield, Ill., U.S.A.).

Antiplatelet agents include, but are not limited to, active agents that bind GPIIb/IIIa sites in a reversible manner and non-steroidal anti-inflammatory drugs (NSAIDs). In a preferred composition, the active agents for binding to or associating with GPIIb/IIIa sites have a circulating half-life of inhibition of 4 hours or less. Examples of suitable antiplatelet agents for binding GPIIb/IIIa sites in a reversible manner are eptifibatide (INTEGRILIN®, Schering-Plough Corporation, Kenilworth, N.J., U.S.A.), orbofiban, xemilofiban, Lamifiban, tirofiban, abciximab, XJ757, DUP728, XR299, linear or novel cyclic RGD peptide analogs, cyclic peptides, peptidomimetics and non-peptide analogs conjugated to Nitric Oxide donor and the like, and mixtures thereof.

Non-steroidal anti-inflammatory drugs (NSAIDS) are commonly available, and typically are used for treating inflammation. Generally, NSAIDS can have a salicylate-like or non-salicylate structure. NSAIDS suitable for the invention can be salicylate-like or non-salicylate NSAIDS that bind reversibly and inhibit platelet aggregation in vitro, but are cleared rapidly, i.e. quickly eliminated from the body, when infused (typically, in less than about 2 hours). NSAIDS suitable for the invention include, but are not limited to, for example, salicylate-like NSAIDS, such as acetaminophen, carprofen, choline salicylate, magnesium salicylate, salicylamide, sodium salicylate, sodium thiosulfate, and the like, and mixtures thereof. Examples of non-salicylate NSAIDS include, but are not limited to, diclofenac sodium, diflunisal, etodolac, fenoprofen calcium, flurbiprofen, hydroxychloroquin, ibuprofen, indomethacin, ketoprofen, ketorolac tromethamine, meclofenamate sodium, mefenamic acid, nabumetone, naproxen, naproxen sodium, oxyphenbutazone, phenylbutazone, piroxicam, sulfinpyrazone, sulindac, tolmetin sodium, dimethyl sulfoxide, and the like, and mixtures thereof.

Antiplatelet agents also include any agent that inhibits chemical pathways within the platelets leading to reduction in platelet activation. Typically, agents that inhibit chemical pathways leading to reduced platelet activation are calcium sequestering agents, such as calcium channel blockers, α-blockers, β-adrenergic blockers, and the like, and mixtures thereof. More specific examples of calcium sequestering agents include, but are not limited to, anticoagulant citrate dextrose solution, anticoagulant citrate dextrose solution modified, anticoagulant citrate phosphate dextrose solution, anticoagulant sodium citrate solution, anticoagulant citrate phosphate dextrose adenine solution, potassium oxalate, sodium citrate, sodium oxalate, amlodipine, bepridil hydrochloride, diltiazem hydrochloride, felodipine, Isradipine, nicardipine hydrochloride, nifedipine, nimodipine, verapamil hydrochloride, doxazosin mesylate, phenoxybenzamine hydrochloride, phentolamine mesylate, prazosin hydrochloride, terazosin hydrochloride, tolazoline hydrochloride, acebutolol hydrochloride, atenolol, betaxolol hydrochloride, bisoprolol fumarate, carteolol hydrochloride, esmolol hydrochloride, indoramine hydrochloride, labetalol hydrochloride, levobunolol hydrochloride, metipranolol hydrochloride, metoprolol tartrate, nadolol, penbutolol sulfate, pindolol, propranolol hydrochloride, terazosin hydrochloride, timolol maleate, guanadrel sulfate, guanethidine monosulfate, metyrosine, reserpine, and the like, and mixtures thereof.

The anticoagulants include Xa inhibitors, such as DX-9065a, RPR-120844, BX-807834 and SEL series Xa inhibitor; IIa inhibitors such as DUP714, hirulog, Argobatran, and hirudin, and mixtures thereof; and other peptidomimetic or non-peptide Xa inhibitors, IIa inhibitors, or mixtures thereof. Some of these inhibitors are discussed in more details below.

In a preferred embodiment, the removal of antiplatelet agent and anti coagulants would involve the use of tangential flow filtration using microfiltration membranes. Microfiltration membrane materials include, but are not limited to, regenerated cellulose, cellulose acetate, polyamide, polyurethane, polypropylene, polysulfone, polyethyl sulfone, polycarbonate, nylon, polyimide and combinations thereof. In one embodiment, the microfiltration membrane is a hollow fiber membrane made of polysulfone or polyethyl sulfone. In another embodiment, the filter membrane tubes has inner diameter of 0.5 mm or greater with the membrane pore size of 0.05 micron or larger. In another embodiment, the membrane has a pore size ranging from a molecular cut off of 3000 daltons to 0.5 micron.

In another embodiment, the platelet preparation is passed through the hollow fiber membrane filter at flow rates ranging from 150 ml/minute to 370 ml/minute. Theses flow rates provide acceptable shear forces from 2000-s to 4000-s. An acceptable pump provides a wide range of flow rates and also provides continuous monitoring of inlet, retentate, permeate and transmembrane pressures. In one embodiment, the pump is the Kros Flow II pump (Spectrum Labs, Rancho Dominguez, Calif.). A replacement fluid suitable for the removal of antiplatelet and anticoagulant agents would be fluids that are used for the storage of platelets. Typically a 10 to 15 volume exchange will result in the removal of better than 99% of the added agents. Typically, 45 to 100 µg of antiplatelet agent, such as Eftifibatide, and 2.5 to 10 mg of anticoagulant, such as Argobatran, may be removed. Typically, a unit of platelets obtained by the buffy coat method would contain $3 \times 10^{11}$ platelets in approximately 300 milliliters plasma or other suitable preservative solution. Platelets collected by aphaeresis usually contain $5 \times 10^9$ platelets in 250 milliliters of plasma or other suitable fluid.

In another embodiment, the platelet preparation is passed through the hollow fiber filter in a diafiltration device at flow rates ranging from 20 to 400 ml/min, preferably 150 to 400 ml/min. The hollow fiber membrane filters with a pore size ranging from molecular cut off of 3000 daltons to 0.5 micron are acceptable. The preferred pore size is 0.05 micron. For the exchange of one unit of platelets (300 to 400 ml) the preferred surface area of the filtration module is 2500 $cm^2$. This along with a flow rate of 370 ml/min allows the complete removal (>99%) of the antiplatelet and anticoagulant agents contained in a unit of platelets in 15 minutes. The diafiltration buffer can be any solution suitable for platelet storage. In one embodiment, the diafiltration buffer is a commercially available platelet storage solution (T-Sol) with 20% plasma.

Another aspect of the present invention relates to a method for removing antiplatelet agents and anticoagulants from a platelet preparation. The method includes the step of passing the platelet preparation through porous material that specifically binds to the antiplatelet agents and anticoagulants.

In certain embodiments, the porous material comprises a nanofiber. Examples of nanofiber include, but are not limited to, cellulose nanofibers, biodegradable nanofibers and carbon nanofibers.

Cellulose nanofibers may be obtained from various sources such as flax bast fibers, hemp fibers, kraft pulp, and rutabaga, by chemical treatments followed by innovative mechanical techniques. The nanofibers thus obtained have diameters between 5 and 60 nm. The ultrastructure of cellulose nanofibers is investigated by atomic force microscopy and transmission electron microscopy. The cellulose nanofibers are also characterized in terms of crystallinity. In one embodiment, the membrane filter is a reinforced composite film comprising 90% polyvinyl alcohol and 10% nanofibers.

The chemistry of these cellulose fibers can be modified to provide specific binding sites for a given antiplatelet agent and an anticoagulant. These fibers can be coated onto the surface of currently available disposable filter platforms like those used for sterilizing small volumes of fluids.

Biodegradable polymers, such as poly(glycolic acid) (PGA), poly(L-lactic acid) (PLLA) and poly(lactic-co-glycolic acid) (PLGA), can be dissolved individually in the proper solvents and then subjected to electrospinning process to make nanofibrous scaffolds. Their surfaces can then be chemically modified using oxygen plasma treatment and in situ grafting of hydrophilic acrylic acid (AA). In one embodiment, the biodegradable nanofibrous scaffold has a fiber thickness in the range of 200-800 nm, a pore size in the range of 2-30 micron, and porosity in the range of 94-96%.

The ultimate tensile strength of PGA will be about 2.5 MPa on average and that of PLGA and PLLA will be less than 2 MPa. The elongation-at-break will be 100-130% for the three nanofibrous scaffolds. When the surface properties of AA-grafted scaffolds are examined, higher ratios of oxygen to carbon, lower contact angles and the presence of carboxylic (—COOH) groups are identified. With the use of plasma treatment and AA grafting, the hydrophilic functional groups can be successfully adapted on the surface of electrospun nanofibrous scaffolds. These surface-modified scaffolds provide the necessary sites for adding ligands specific to the binding of a given antiplatelet agent and anticoagulant.

There are several approaches that can be utilized to convert activated carbon into bioreactive fibers. An example is provided to demonstrate the ability of these modified carbon nanofibers to provide carboxylic, hydroxyl and other chemically reactive sites for the binding of any ligand of interest.

Carbon nanofibers (CNF) can be synthesized by chemical vapor deposition (CVD). Amino acids, such as alanine, aspartic acid, glutamic acid and enzymes such as glucose oxidase (GOx) can be adsorbed on CNF. The properties of CNF (hydrophilic or hydrophobic) are characterized by the pH value, the concentration of acidic/basic sites and by naphthalene adsorption. These fibers are readily amenable to crosslinking with ligands of interest, i.e., the ability to selectively bind to antiplatelet agents and anticoagulants.

Another aspect of the present invention relates to a filtering tube for removing antiplatelet agents and anticoagulants from a platelet preparation. The filtering tube has an inner diameter of at least 0.5 mm and comprises a filter membrane with a pore size ranging from molecular cut off of 3000 daltons to 0.5 micron.

Another aspect of the present invention relates to a filter for removing antiplatelet agents and anticoagulants from a platelet preparation. The filter comprises a nanofiber that is modified to bind specifically to an antiplatelet agent or an anticoagulant.

In a related embodiment, the nanofiber is one of a cellulose nanofiber, a biodegradable nanofiber, and a carbon nanofiber.

The present invention is further illustrated by the following examples which should not be construed as limiting. The contents of all references, patents and published patent applications cited throughout this application, as well as the Figures and Tables are incorporated herein by reference.

Example 1

Removal of Integrilin Using Diafiltration

A standard UV absorbance curve at 214 nm with Integrilin concentrations ranging from 3 to 50 µg/ml was established based on the following measurements:

| Integrilin Concentration | O.D 214 |
|---|---|
| 50 ug/ml | 0.710 |
| 25 ug/ml | 0.532 |
| 12.5 ug/ml | 0.299 |
| 6.25 ug/ml | 0.126 |
| 3.125 ug/ml | 0.015 |

A test fluid containing 50 µg/ml Integrilin was circulated through a hollow fiber filter (Spectrum Laboratories X20S-300-O2S) at a circulation rate of 100 ml/min. Briefly, the test fluid was placed in an air tight container with a starting OD214 of 0.710. As the test fluid circulated through the hollow fiber filter, the retentate volume decreased. The lost fluid volume was replaced with fresh fluid from a second container. After about a 10 minute circulation and a six volume exchange, the OD214 of the test fluid was less than 0.01.

Example 2

Removal of Inhibitors from Platelet Concentrate

Figure 2:
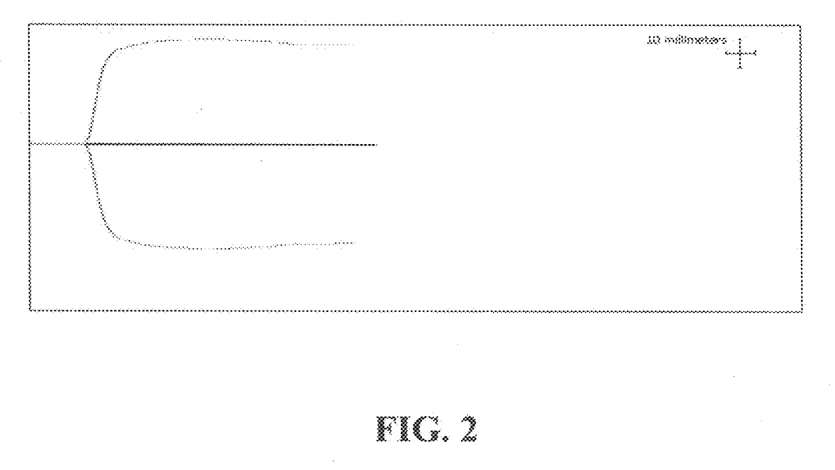
FIG. 2 is a thromboelastography (TEG) of platelets with inhibitors before (black) and after plasma filtration (green).
Figure 3:
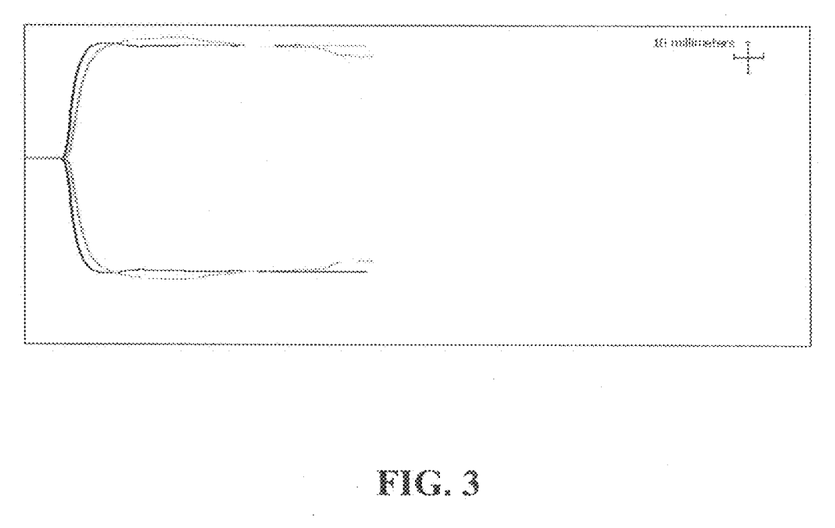
FIG. 3 is a TEG of platelets with saline before (black) and after plasma filtration (green).
Figure 4:
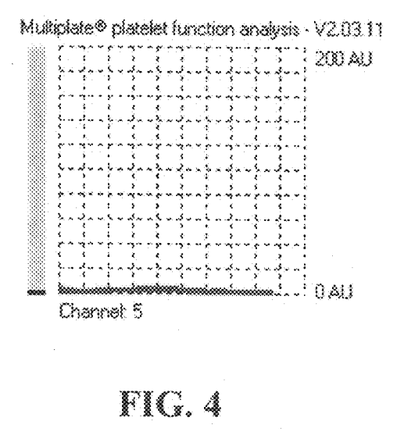
FIG. 4 is a diagram showing the platelet response to TRAP in the presence of the inhibitors.
Figure 5:
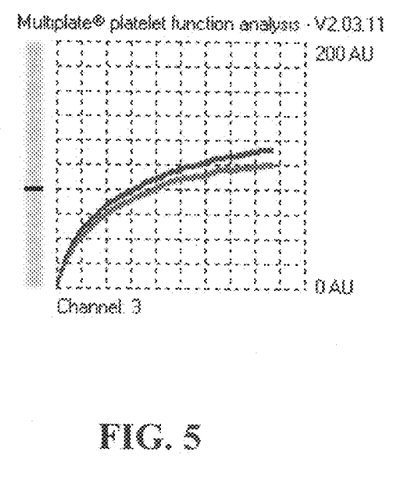
FIG. 5 is a diagram showing the platelet response to TRAP after the removal of the inhibitors.
Figure 6:
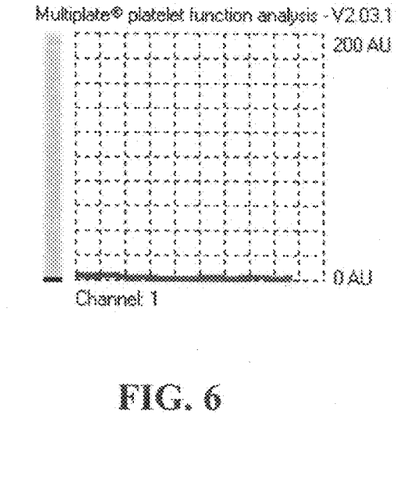
FIG. 6 is a diagram showing the platelet response to collagen in the presence of the inhibitors.
Figure 7:
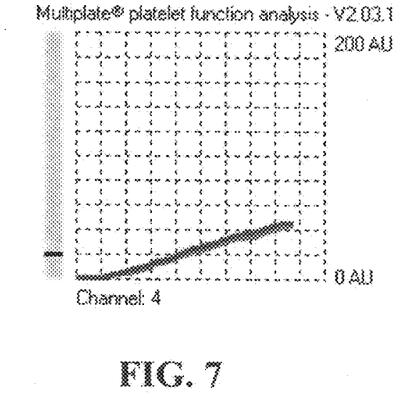
FIG. 7 is a diagram showing the platelet response to collagen after the diafiltration

In one experiment, platelet concentrates obtained by the buffy coat method were used for the study. 48 micrograms of Integrilin (Eptifibatide), a GPIIb/IIIa inhibitor and 2.4 mg of Argabotran, a synthetic thrombin inhibitor, were added to 350 ml of platelets. Removal of the inhibitors was initiated by diafiltration. 15 ml of the platelet concentrate was diafiltered against 60 ml of a solution containing 20% fresh frozen plasma in a commercially used platelet storage solution (T-sol). The samples were stored overnight and platelet functionality was measured on Day 2, by Thromboelastography (TEG) and using standard agonists such as TRAP and Collagen. FIG. 2 shows the TEG scan of the test sample before (black line) and after diafiltration (green line). FIG. 3 shows the TEG scan of a control sample (platelets with saline) before (black line) and after diafiltration (green line). The result in FIG. 3 suggests that most inhibitors had been removed by diafiltration. FIG. 4 shows the response to TRAP in the presence of the inhibitors. FIG. 5 shows the response to TRAP after the removal of the inhibitors. FIG. 6 shows the response to collagen in the presence of the inhibitors and finally FIG. 7 shows the response to Collagen after the diafiltration.

In another experiment, Integrilin and Argabotran were added to platelet units at three times the therapeutic concentrations (i.e., 48 micrograms for Integrilin and 2.4 mg for Argatroban in 350 ml of platelets). Prior to the addition of the inhibitors, baseline data of platelet functionality was obtained. These baseline data included thromboelastography, which assesses overall platelet function and clot strength, as well as the TRAP test and the collagen test, which are additional markers of platelet functionality.

Figure 8:
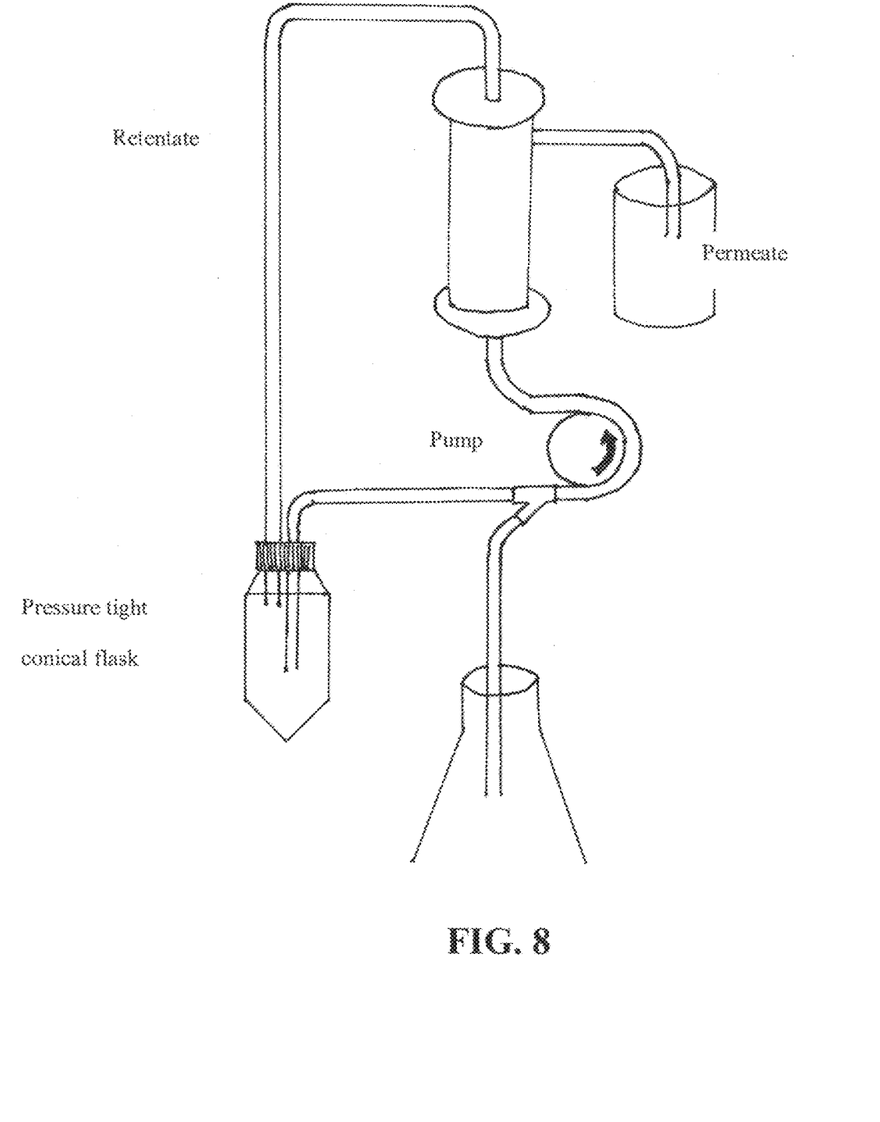
FIG. 8 is a diagram showing an experimental platelet filtration system.

The diafiltration was conducted in 40 ml aliquots using an airtight 50 ml conical flask, a polysulfone hollow fiber cross flow module with a surface area of 240 $cm^2$ (FIG. 8). A sequential exchange with increasing volumes of standard platelet additive solution (Intersol), indicated that a 15 volume exchange provided optimum results with the inhibitors. The pore size of the hollow fiber membrane selected was 0.05 micron. The pore size can range from 3000 daltons molecular weight cut off to 0.5 micron. The 15 volume exchange can be conducted with any currently available additive solution used for storing platelets.

Following the 15 volume exchange, homologous fresh frozen plasma was added to the platelets to achieve a plasma concentration of 25% (v/v). This is required because the plasma provides the soluble components of coagulation, thereby permitting the functionality tests performed.

The recirculation rate of the platelets (in Intersol containing 30% plasma) was set at 370 ml/minute. This was calculated to create a shear force of approximately 4000-s. This shear force has been shown not to activate platelets.

The Inlet pressure over three experiments was 8.13 psi, the retentate pressure was 6.15 psi. The pressure differential was 2 psi. The permeate pressure was essentially 0 and the transmembrane pressure was 7.15 psi. These pressures remained very constant throughout the exchange, indicating no fouling of the membrane. The permeate flow rate was around 26 ml/minute.

Figure 9:
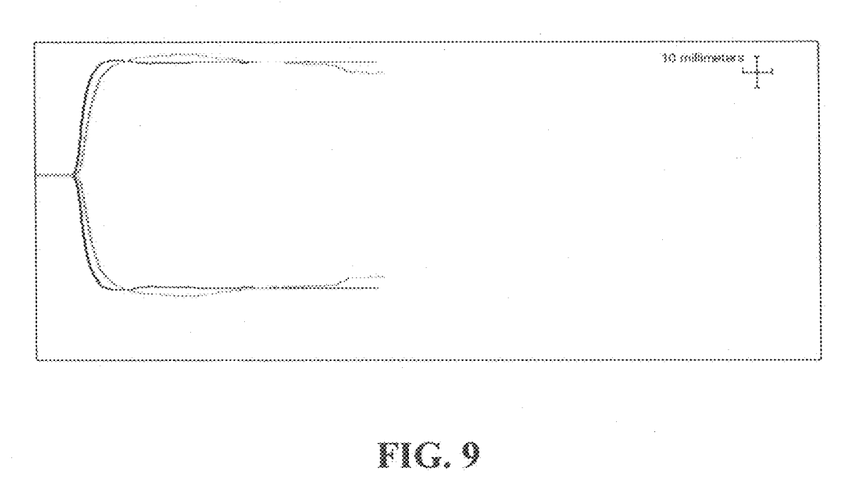
FIG. 9 is a thromboelastogram showing (black line) platelets without inhibitors and platelets after the antiplatelet agents had been removed with 15 volume exchange (green line)

When Argatroban is present, it completely blocks the activation of platelets and hence on the thromboelastogram, one sees a straight line. FIG. 9 shows the thromboelastograms of platelets without the inhibitors. The R value, i.e., the time it takes before the clot starts to form, as indicated by the splitting of the line, averaged 10.7 minutes. Following the 15 volume exchange, the average R value was 10.75. In a total of 4 experiments conducted, the R value after 15 volume exchange was equal to or less than the baseline R value. Based on the thromboelastogram, at least a 99.99% removal of inhibitors was achieved.

The maximum amplitude, MA, was unchanged from baseline, when the slight dilution of the platelets during the 15 volume exchange is taken into consideration. This parameter reflects the removal of Integrilin.

Figure 10:
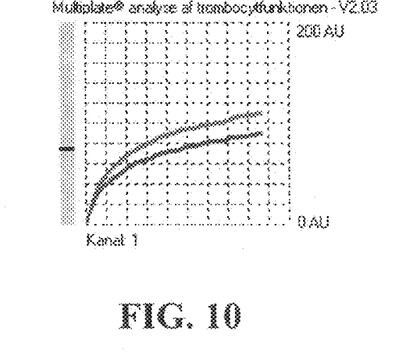
FIG. 10 is a diagram showing the platelet response to TRAP in the absence of the inhibitors.
Figure 11:
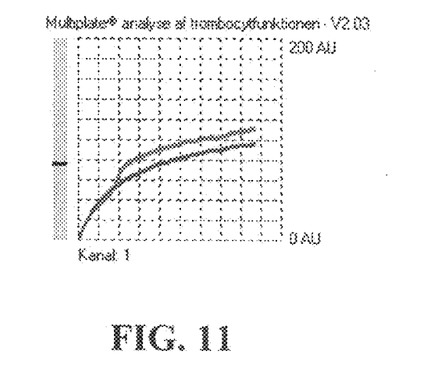
FIG. 11 is a diagram showing the platelet response to TRAP after the removal of inhibitor by 15 volume exchange with Intersol.

FIG. 10 shows the results of the Trap assay run on the platelets prior to the addition of the inhibitors. The area under the curve is expressed as standardized units. The control had a value of 67. The same assay run on the platelets after 15 volume exchange with Intersol was 68 (FIG. 11). This assay is more sensitive to the presence of Integrilin. It therefore indicates essentially complete removal of this inhibitor.

Figure 12:
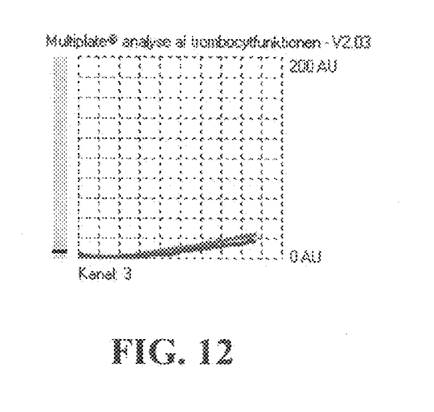
FIG. 12 is a diagram showing the platelet response to collagen in the absence of the inhibitors.
Figure 13:
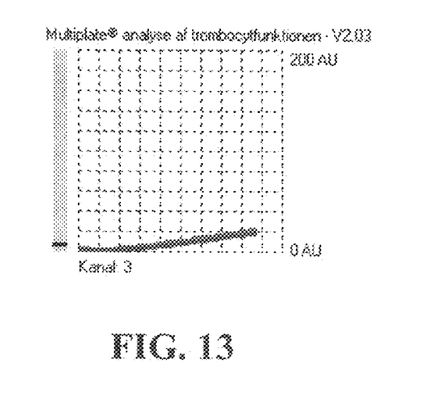
FIG. 13 is a diagram showing the platelet response to collagen after the removal of inhibitor by 15 volume exchange with Intersol.

The functionally of the platelets was also tested using collagen as the activator. The baseline value for the platelets was 6 (FIG. 12). The value obtained for the platelets following the removal of the inhibitors with 15 volume exchange with Intersol was also 6 (FIG. 13).

The experiment described above is a method by which complete replacement of plasma in platelet concentrates, whether collected by apheresis, buffy coat or any other method, can be readily accomplished.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following embodiments. The embodiments are intended to cover the claimed components and steps in any sequence which is effective to meet the objectives there intended, unless the context specifically indicates the contrary.

What is claimed is:

1. A method for removing antiplatelet agents and anticoagulants from a platelet preparation using diafiltration, comprising:
    circulating a platelet preparation comprising platelets, a short-to-ultra short acting antiplatelet agent comprising a short-to-ultrashort GPIIb/IIIA inhibitor, and a short-to-ultra short acting anticoagulant comprising a short-to-ultrashort acting factor Xa inhibitor through a hollow fiber membrane capable of separating the antiplatelet agent and the anticoagulant from the platelets,
    wherein a diafiltration buffer is added to the platelet preparation during circulation to maintain a constant volume of the platelet preparation.

2. The method of claim 1, wherein the hollow fiber membrane comprises a material selected from the group consisting of regenerated cellulose, cellulose acetate, polyamide, polyurethane, polypropylene, polysulfone, polyethersulfone, polycarbonate, nylon, polyimide and combinations thereof.

3. The method of claim 1, wherein the hollow fiber membrane comprises polysulfone or polyethylsulfone.

4. The method of claim 1, wherein the hollow filter membrane has an inner diameter of at least 0.5 mm and a pore size ranging from molecular cut off of 3000 daltons to 0.5 micron.

5. The method of claim 1, wherein the platelet preparation flows through the hollow fiber membrane at a flow rate of 150 to 400 ml/min.

6. The method of claim 1, wherein the diafiltration buffer comprises 20% plasma.

7. The method of claim 1, wherein the platelet preparation is circulated through the hollow fiber membrane until a 10 to 15 volume exchange with the diafiltration buffer is achieved.

* * * * *